PATENTED JUL 26 1870

N. G. Blauser. Sulky Cultivator.

105630

Witnesses:
A. W. Almqvist
L. S. Mabee

Inventor:
N. G. Blauser
Per
Attorneys

United States Patent Office.

NOAH G. BLAUSER, OF ETNA, OHIO.

Letters Patent No. 105,630, dated July 26, 1870.

IMPROVEMENT IN SULKY-CULTIVATORS.

The Schedule referred to in these Letters Patent and making part of the same.

*To all whom it may concern:*

Be it known that I, NOAH G. BLAUSER, of Etna, in the county of Licking and State of Ohio, have invented a new and useful Improvement in Sulky-Cultivator; and I do hereby declare that the following is a full, clear, and exact description thereof, which will enable others skilled in the art to make and use the same, reference being had to the accompanying drawing forming part of this specification.

Similar letters of reference indicate corresponding parts.

My invention has for its object to furnish an improved cultivator, light, strong, and durable, easy of draft, fully under the control of the driver, and guarded from breakage, should the shovels strike an obstruction; and It consists in the construction and combination of the various parts of the cultivator, as hereinafter more fully described.

A are the sulky-wheels of the cultivator, which revolve upon and are attached to the axles of the axle-tree B in the ordinary manner. The axle-tree B is bent twice, at or nearly at right angles, near each wheel, the upright parts of said axle-tree being made sufficiently long to allow the middle part of the axle-tree to pass over the plants being cultivated, without injuring them, even should the said plants be quite high.

C is the tongue, the rear end of which is securely attached to the middle part of the axle-tree B, and which is sustained against side strain in turning, guiding, and controlling the machine by the curved braces or hounds D.

E are the plow-beams, the forward ends of which are pivoted to the braced cross-bar or triangular frame, or plate F, the middle part of which is secured to the middle part of the lower side of the tongue C.

Figure 1:
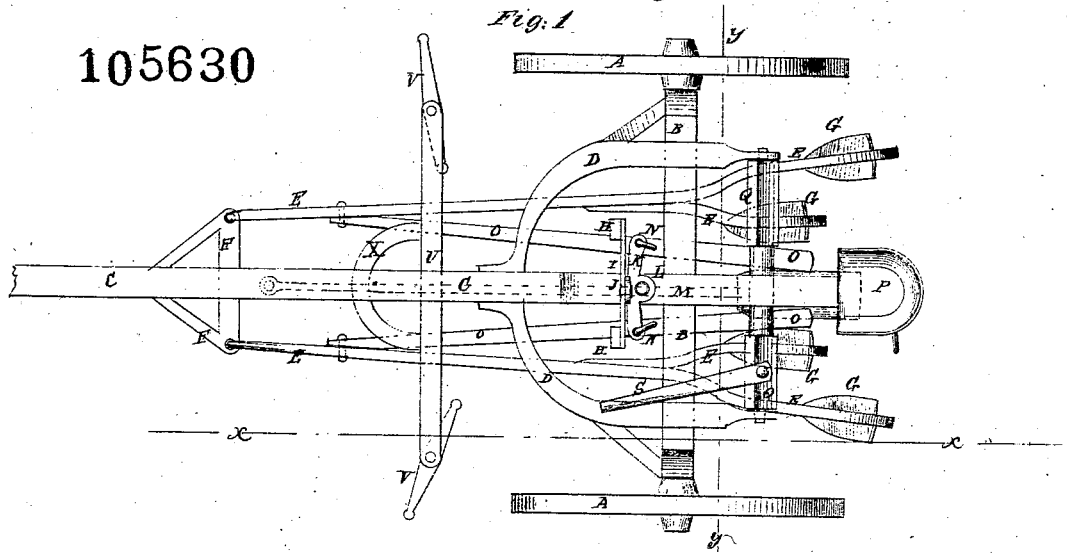
Figure 1 is a top view of my improved cultivator.
Figure 2:
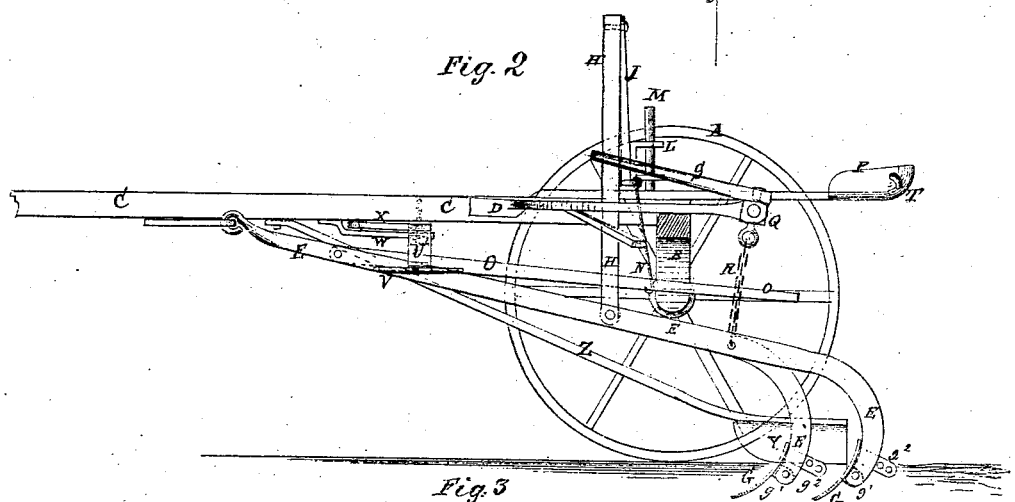
Figure 2 is a side view of the same, partly in section, through the line $x\,x$, fig. 1.
Figure 3:
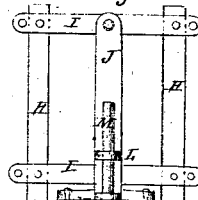
Figure 3 is a detail vertical cross-section of the same, taken through the line $y\,y$, fig. 1.

The rear parts of the beams E are branched, as shown in fig. 1, are curved downward, as shown in fig. 2, and their lower ends are slotted to receive the ears of the shovels G.

The shovels G may be plain shovels, or they may be made oblique, to throw the soil around or from the plants, as they may be attached to the one or the other beam E.

To the middle part of the rear side of the shovels or plows G is attached, or upon it is formed, an ear, $g^1$, which is pivoted to the slotted lower ends of the beams E. To the upper part of the rear side of the shovels G is attached, or upon it is formed, another ear, $g^2$, which is made longer than the ear $g^1$, passes through the slot in the lower end of the beam E, and has several holes formed in it, to receive a wooden pin, which rests against the rear sides of the slotted lower ends of the beams. By this construction, by shifting the wooden pin from one hole to another of the ear, $g^2$, the pitch of the plows may be adjusted at will, and should the shovel strike an obstruction, the wooden pin will be broken, allowing the plow to turn back upon the lower ends of the beams E, and effectually guarding against breakage.

To the middle parts of the beams E are securely attached the lower ends of the two uprights, H, the middle and upper parts of which are connected by the cross-bars I, the ends of which are pivoted to the said uprights H, several holes being formed in the ends of the said bars I, to receive the pivoting bolts, so that the plow-beams E may be adjusted at a greater or less distance apart, as may be desired.

To the center of the upper cross-bar I is pivoted the upper end of the bar J, which extends down to or nearly to the lower cross-bar I, and upon its lower end is formed, or to it is rigidly attached, a cross-bar, K.

To the rear side of the lower part of the bar J is pivoted a guide or keeper, L, through which passes a guide-rod, M, the lower end of which is securely attached to the rear part of the tongue C.

To the ends of the cross-bar K are pivoted the upper ends of the connecting-rods or chains N, the lower ends of which are pivoted or attached to the foot-levers O. The forward ends of the levers O are pivoted to the forward parts of the beams E, and their rear ends extend back beneath the middle part of the axle-tree B, into such a position that they may be conveniently reached and operated by the driver with his feet while sitting upon his seat, P. By this construction the driver, by bearing down with one or the other foot, can move the plow-beams laterally to one or the other side, for guiding the plows when cultivating crooked rows, or for avoiding irregular hills, obstructions, &c., and by pressing down with both feet the driver can force the plows into the ground.

Q is a roller or shaft, the ends of which are pivoted to the projecting rear ends of the braces or hounds D, or to other supports attached to the axle-tree B.

To one side of the shaft Q, near its ends, are attached the upper ends of the chains or jointed connecting-rods R, the lower ends of which are attached to the plow-beams E, so that, by partially revolving the said shaft or roller Q, the plow-beams and plows may be raised from the ground, for convenience in turning the machine or passing from place to place.

S is a lever pivoted to the shaft Q, and which, when the plows are in working position, projects forward at the side of the upright H. When the plows are to be raised from the ground, the lever S is drawn back, partially revolving the shaft Q, and its free end may be caught upon the catch T, attached to the side of the seat P.

U is the doubletree, to the ends of which are attached the whiffletree V, and which is pivoted, at its center, to the under side of the tongue C.

The doubletree U is held up against the tongue C by a keeper, W, attached to said tongue, and is kept in a horizontal position by a semicircular arm or plate, X, attached to the said doubletree U, and working in the said keeper W, as shown in figs. 1 and 2. This construction allows the doubletree to be placed in the rear of the forward ends of the plow-beams E, so that the horses may walk at the sides of the said plow-beams, and close to the sulky-wheels A, making the machine very compact, and enabling it to be turned in a very small space.

Y is a guard to protect small plants from being covered or injured, by having the soil thrown around or over them while being cultivated. The guard Y is made in the form of a small sled, with close sides or runners, said sides being made high enough for the said plants to pass under the beams or cross-bars of the said shield or guard Y without being injured.

The guard Y is detachably connected with the tongue C by a long, flexible tongue, Z, which should have sufficient rigidity to enable the guard Y to be guided, and sufficient flexibility to enable it to conform to irregularities of the surface of the ground.

Having thus described my invention,

I claim as new and desire to secure by Letters Patent—

The improved cultivator, consisting of the tongue C, hounds D, axle B, wheels A, triangle F, plow-beams E, pivoted adjustable plows G $g^1$ $g^2$, rollers Q, lever S, chain R, foot-levers O, rods N, bar K, standard M, bar J, uprights H, adjustable bars I, and scraper Y, removably attached to the tongue C, all constructed and relatively arranged as shown and described.

NOAH G. BLAUSER.

Witnesses:
H. B. GRABLE,
J. F. CONINE.